US012152685B2

(12) United States Patent
Kuriki et al.

(10) Patent No.: US 12,152,685 B2
(45) Date of Patent: Nov. 26, 2024

(54) FLUID CONTROL APPARATUS

(71) Applicant: FUJIKIN INCORPORATED, Osaka (JP)

(72) Inventors: Haruhiko Kuriki, Osaka (JP); Shinya Nogari, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 252 days.

(21) Appl. No.: 17/563,487

(22) Filed: Dec. 28, 2021

(65) Prior Publication Data

US 2022/0120355 A1  Apr. 21, 2022

Related U.S. Application Data

(63) Continuation of application No. PCT/JP2020/022767, filed on Jun. 10, 2020.

(30) Foreign Application Priority Data

Jun. 28, 2019 (JP) ................. 2019-121119

(51) Int. Cl.
*F16K 27/00* (2006.01)
*F16K 49/00* (2006.01)

(52) U.S. Cl.
CPC ............ *F16K 27/003* (2013.01); *F16K 49/00* (2013.01)

(58) Field of Classification Search
CPC ............................... F16K 27/003; F16K 49/00
See application file for complete search history.

(56) References Cited

U.S. PATENT DOCUMENTS 6,361,081 B1 * 3/2002 Yokoyama ............ F16K 27/003
  285/124.3
7,726,333 B2 * 6/2010 Hoshi .................... F16K 49/002
  137/341
(Continued)

FOREIGN PATENT DOCUMENTS

CN  1950931 A  4/2007
CN  101198815 A  6/2008
(Continued)

OTHER PUBLICATIONS

KRIPO Request for the Submission of an Opinion for corresponding KR Application No. 10-2022-7002675; Date of Mailing, Jun. 17, 2023.
(Continued)

*Primary Examiner* — Michael R Reid
(74) *Attorney, Agent, or Firm* — CANTOR COLBURN LLP

(57) ABSTRACT

A fluid control apparatus includes: a base plate; and a gas line installed on the base plate. The gas line includes a resin member provided in a predetermined direction on the base plate, a first bracket provided on the resin member, a plurality of joints provided on the first bracket, a plurality of fluid control devices provided to the plurality of joints, and a heater mounted to the plurality of joints and the plurality of fluid control devices. The first bracket includes a first fixing portion fixed to the resin member, a first leg portion extending from the first fixing portion in a direction of away from the base plate, and a first installation portion protruding from an end portion of the first leg portion on an opposite side to the first fixing portion to intersect with the first leg portion and on which the joints are installed.

5 Claims, 3 Drawing Sheets

(56) References Cited

U.S. PATENT DOCUMENTS

| | | | |
|---|---|---|---|
| 2002/0033195 A1* | 3/2002 | Fujimoto | F16K 27/003 |
| | | | 137/884 |
| 2006/0027274 A1 | 2/2006 | Funes et al. | |
| 2018/0087684 A1* | 3/2018 | Nogari | F16K 27/00 |
| 2020/0149162 A1 | 5/2020 | Hidaka et al. | |

FOREIGN PATENT DOCUMENTS

| | | |
|---|---|---|
| CN | 208967324 U | 6/2019 |
| JP | H11294615 A | 10/1999 |
| JP | 2007030059 A | 2/2007 |
| KR | 20070011549 A | 1/2007 |
| WO | 2005109482 A1 | 11/2005 |
| WO | 2006100960 A1 | 9/2006 |
| WO | 2019021948 A1 | 1/2019 |

OTHER PUBLICATIONS

Chinese Office Action corresponding to CN Application No. 2020-800385436; Issue Date, Oct. 19, 2022.

* cited by examiner

FLUID CONTROL APPARATUS

CROSS REFERENCE TO RELATED APPLICATION

This application is a continuation 35 U.S.C. § 120 of PCT/JP2020/022767, filed Jun. 10, 2020, which is incorporated herein by reference and which claimed priority to Japanese Application No. 2019-121119, filed Jun. 28, 2019. The present application likewise claims priority under 35 U.S.C. § 119 to Japanese Application No. 2019-121119, filed Jun. 28, 2019, the entire content of which is also incorporated herein by reference.

TECHNICAL FIELD

The present disclosure relates to a fluid control apparatus.

BACKGROUND

An integration valve device, in which a heater block is attached to an integration unit on a base plate to heat the integration unit to a predetermined temperature, has been proposed (see, for example, Japanese Patent Application Publication No. H11-294615).

SUMMARY

In recent years, the temperature of the integration unit heated by the heater block tends to increase. However, when the temperature of the integration unit increases, the temperature of a fluid control device adjacent to the integration unit also increases, which affects a fluid flowing through the fluid control device.

Therefore, an object of the present disclosure is to provide a fluid control apparatus capable of suppressing the influence of the heat of a heater, which heats a gas line, on an adjacent fluid control device.

A fluid control apparatus according to one or more embodiments of the present disclosure includes: a base plate; and a gas line that is installed on the base plate. The gas line includes a resin member that is provided in a predetermined direction on the base plate, a first bracket that is provided on the resin member, a plurality of joints that is provided on the first bracket, a plurality of fluid control devices that is provided to the plurality of joints, and a heater that is mounted to the plurality of joints and the plurality of fluid control devices. The first bracket includes a first fixing portion that is fixed to the resin member, a first leg portion that extends from the first fixing portion in a direction of away from the base plate, and a first installation portion that protrudes from an end portion of the first leg portion on an opposite side to the first fixing portion to intersect with the first leg portion and on which the joints are installed.

DETAILED DESCRIPTION

A fluid control apparatus according to an embodiment of the present disclosure will be described with reference to the drawings. In the following description, an upward direction and a downward direction are an upward direction and a downward direction in FIG. 1, a direction in which a gas line 3 extends is a first direction D1 (a predetermined direction), and a direction parallel to a base plate 2 and orthogonal to the first direction D1 is a second direction D2.

Figure 1:
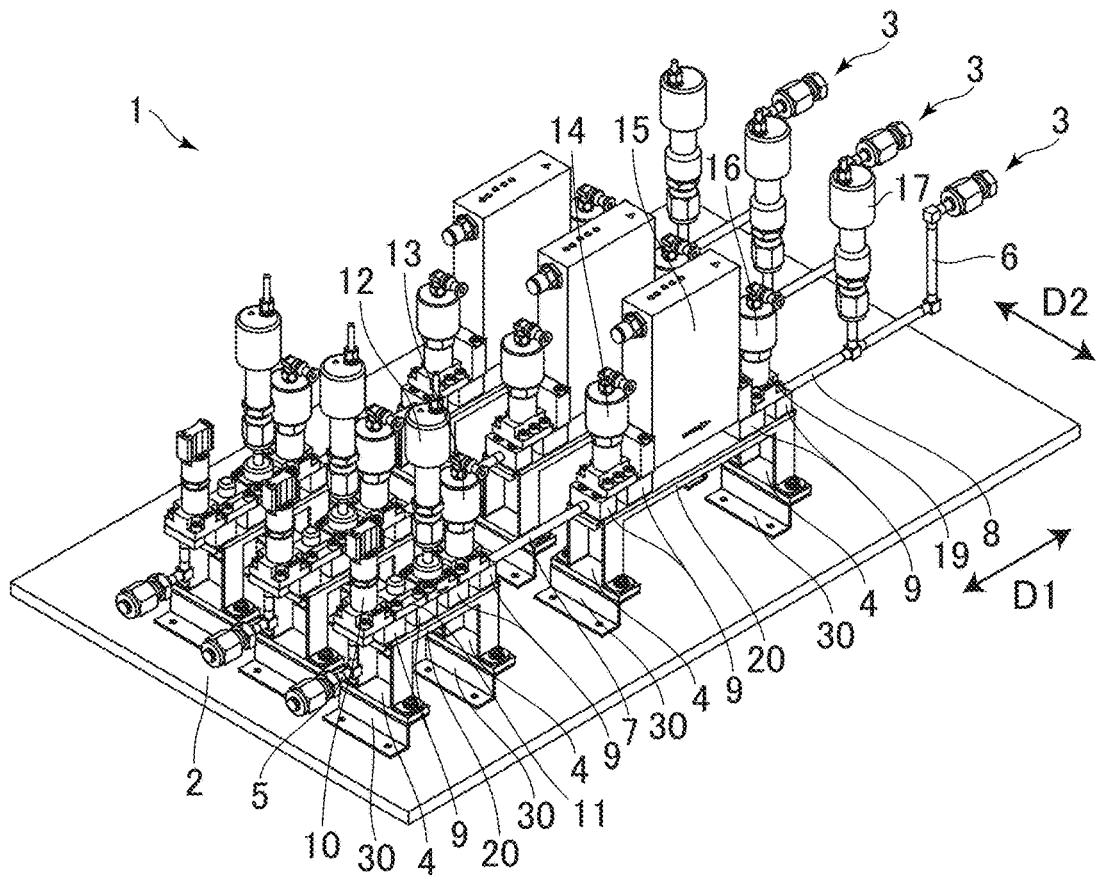
FIG. 1 is a perspective view of a fluid control apparatus according to a present embodiment.
Figure 2:
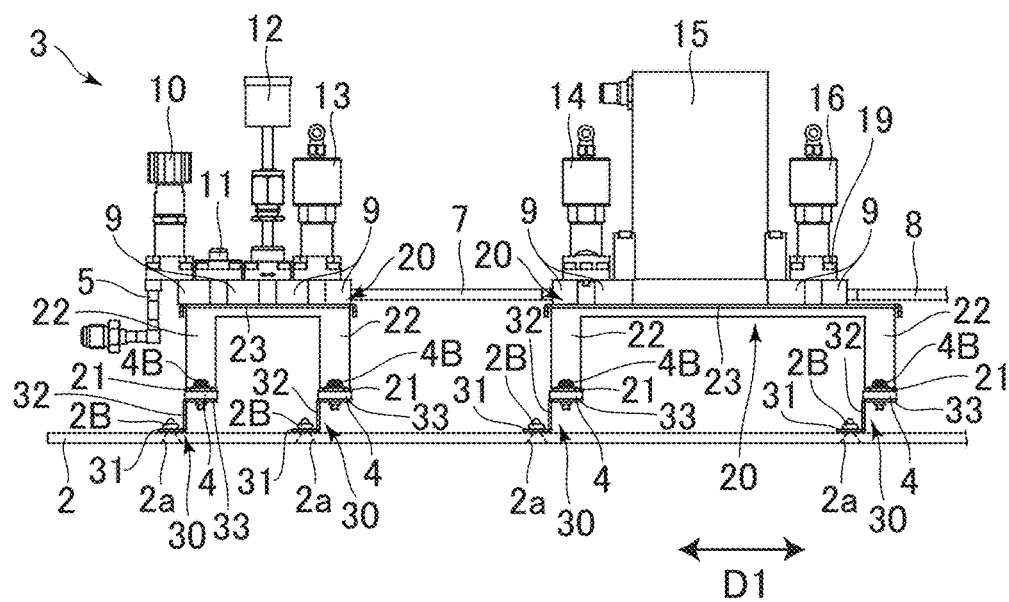
FIG. 2 is a side view of a gas line.
Figure 3:
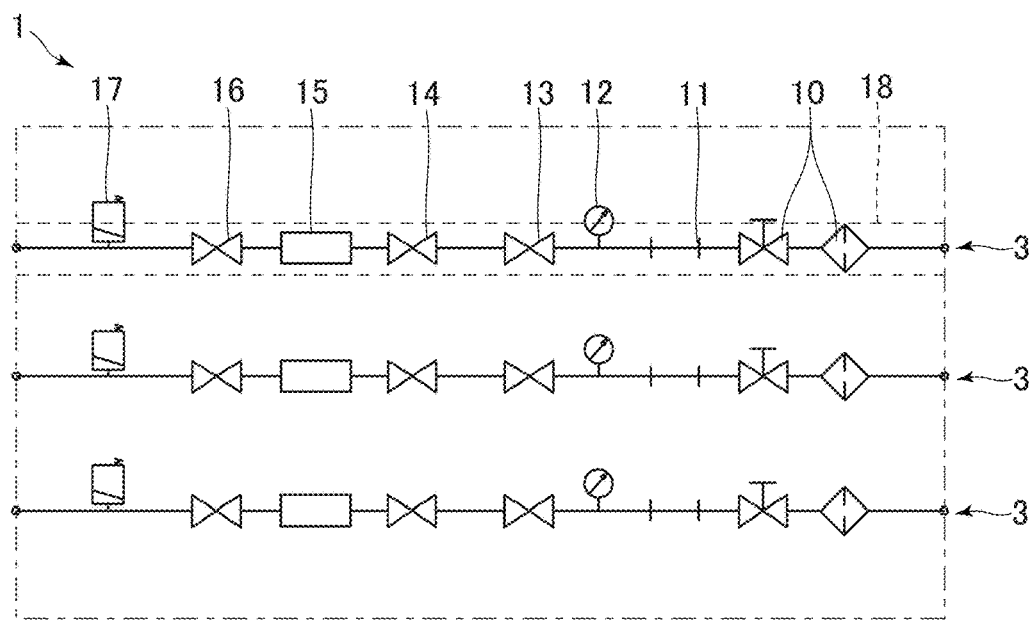
FIG. 3 is a system diagram of the fluid control apparatus.

FIG. 1 is a perspective view of a fluid control apparatus 1 according to the present embodiment.
FIG. 2 is a side view of a gas line 3.
FIG. 3 is a system diagram of the fluid control apparatus 1.

As shown in FIGS. 1 to FIG. 3, the fluid control apparatus 1 includes a base plate 2 and a plurality of gas lines 3. In the present embodiment, three gas lines 3 are provided on the base plate 2, but the number of gas lines 3 is not limited thereto.

The base plate 2 is formed of a metal material such as stainless steel and is, for example, a plate serving as a bottom wall of a gas box. A plurality of rivet holes 2a (FIG. 2) are formed in the base plate 2. Each rivet hole 2a has a truncated cone shape.

Each gas line 3 includes a plurality of resin members 4, a plurality of first brackets 20, a plurality of second brackets 30, an inlet pipe 5, an outlet pipe 6, connecting pipes 7 and 8, a plurality of joints 9, a plurality of fluid control devices 10 to 17, and a heater 18 (FIG. 3). The heater 18 is provided in only one gas line 3. In FIG. 1 and FIG. 3, reference signs are assigned to components in only one gas line 3. The heater 18 is not shown in FIG. 1 and FIG. 2.

The plurality of second brackets 30 are provided to align on the base plate 2 in the first direction D1. The plurality of resin members 4 are provided on the second brackets 30 corresponding thereto. The plurality of first brackets 20 are provided on the plurality of resin members 4. The detailed configuration of each of the first brackets 20, each of the resin members 4, and each of the second brackets 30 will be described later.

The inlet pipe 5 serves as an inlet for a fluid in the gas line 3. The outlet pipe 6 serves as an outlet for the fluid in the gas line 3. The connecting pipe 7 connects the joints 9. The connecting pipe 8 connects the joint 9 located at the most downstream side and the outlet pipe 6. The plurality of joints 9 each have a block shape, are located between the inlet pipe 5 and the outlet pipe 6, and are provided to align on the plurality of first brackets 20. A gas flow path is formed in each joint 9. The joints 9 are fixed to the first brackets 20 respectively with bolts (not shown).

The plurality of fluid control devices 10 to 17 are a manual valve device 10 including a filter, a free block 11, a pressure gauge 12, automatic valve devices (for example, fluid-driven automatic valve devices) 13, 14, and 16, a flow rate control device (for example, a mass flow controller (MFC)) 15, and a pressure switch 17. As shown in FIG. 3, the fluid control devices 10 to 16 are fixed to the joints 9 corresponding thereto with bolts 19. For simplification of the figure, a reference sign is assigned to only one bolt 19. The pressure switch 17 is connected to the connecting pipe 8.

The heater 18 is, for example, a ribbon heater, which is attached to one gas line 3 out of the three gas lines 3 and heats the gas line 3 to a predetermined temperature (for example, 95° C.).

Figure 4:
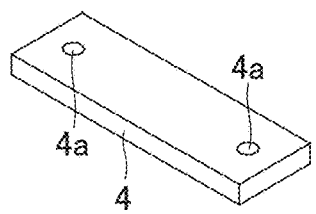
FIG. 4 is a perspective view of a resin member.

Each resin member 4 is formed of a resin material having excellent heat insulating properties (for example, polytetrafluoroethylene (PTFE) or polyetherimide (PEI)). As shown in FIG. 4, each resin member 4 has a plate shape of substantially a rectangular shape in a plan view. Two bolt insertion holes 4a into each of which one of bolts 4B (FIG. 2) is inserted are formed in each resin member 4.

Figure 5:
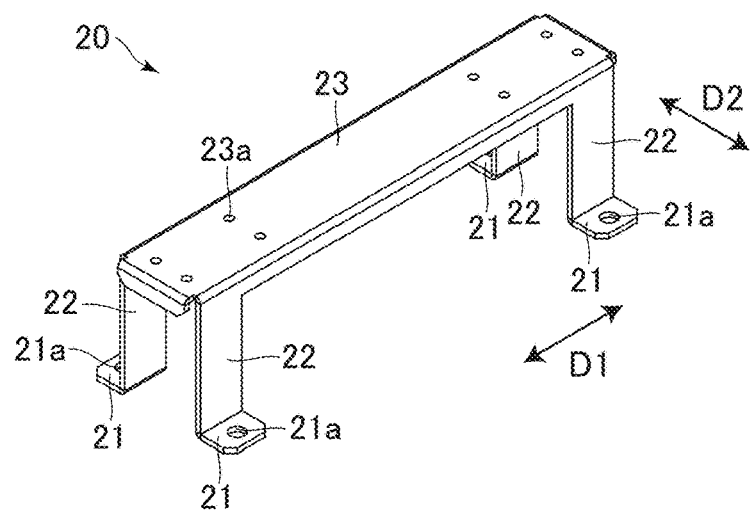
FIG. 5 is a perspective view of a first bracket.

FIG. 5 is a perspective view of the first bracket 20.

The first bracket 20 is formed by bending a flat plate made of a metal (for example, SUS 304 or SPCC) and includes four first fixing portions 21, four first leg portions 22, and a first installation portion 23. A bolt insertion hole 21a into which one of the bolts 4B (FIG. 2) is inserted is formed in each first fixing portion 21. Each first leg portion 22 extends upward from an inner end of the first fixing portion 21 corresponding thereto. That is, each first leg portion 22 extends from the first fixing portion 21 corresponding thereto away from the base plate 2 (to a side away therefrom).

The first installation portion 23 is connected to an upper end of each first leg portion 22 and is orthogonal to each first leg portion 22. That is, the first installation portion 23 protrudes from an end portion of each first leg portion 22 on a side opposite to the first fixing portion 21 to intersect with each first leg portion 22. Therefore, a space is formed between the first installation portion 23 and the base plate 2. A plurality of bolt screwing holes 23a into each of which a bolt (not shown) for fixing the joint 9 is screwed are formed in the first installation portion 23. For simplification of the figure, a reference sign is assigned to only one bolt screwing hole 23a.

Figure 6:
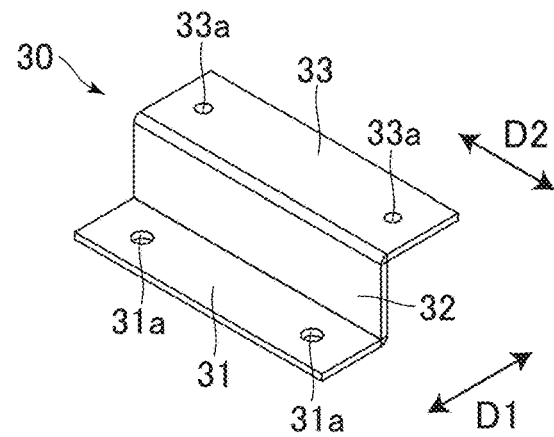
FIG. 6 is a perspective view of a second bracket.

FIG. 6 is a perspective view of the second bracket 30.

The second bracket 30 is formed by bending a flat plate made of a metal (for example, SUS 304 or SPCC) and includes a second fixing portion 31, a second leg portion 32, and a second installation portion 33. Two rivet insertion holes 31a into each of which one of rivets 2B (FIG. 2) is inserted are formed in the second fixing portion 31. Each second leg portion 32 extends upward from an edge of the second fixing portion 31. That is, the second leg portion 32 extends from the second fixing portion 31 away from the base plate 2 (to a side away therefrom).

The second installation portion 33 is connected to an upper end of the second leg portion 32 and is orthogonal to the second leg portion 32. That is, the second installation portion 33 protrudes from an end portion of the second leg portion 32 on a side opposite to the second fixing portion 31 to intersect with the second leg portion 32. Therefore, a space is formed between the second installation portion 33 and the base plate 2. Two bolt screwing holes 33a into each of which one of the bolts 4B (FIG. 2) is screwed are formed in the second installation portion 33.

As shown in FIG. 2, one of the rivets 2B is inserted into each rivet insertion hole 31a (FIG. 6) of the second fixing portion 31 of each second bracket 30 and each rivet hole 2a of the base plate 2, and a mandrel is pulled and cut. Accordingly, the second bracket 30 is fixed to the base plate 2.

Each resin member 4 is installed on the second installation portion 33 of the corresponding second bracket 30, and two first fixing portions 21 of the first bracket 20 are installed on each resin member 4. One of the bolts 4B is inserted into each of the bolt insertion holes 4a (FIG. 4) of each resin member 4 and the bolt insertion hole 21a (FIG. 5) of each first fixing portion 21, and one of the bolts 4B is screwed into each of the bolt screwing holes 33a (FIG. 6) of each second installation portions 33. Accordingly, each resin member 4 and each first bracket 20 are fixed to the second bracket 30 corresponding thereto.

According to the fluid control apparatus 1 described above, the gas line 3 includes the resin members 4 provided in the first direction D1, the first brackets 20 provided on the resin members 4, and the plurality of joints 9 provided on the first brackets 20, the plurality of fluid control devices 10 to 16 provided in the plurality of joints 9, and the heater 18 mounted on the plurality of joints 9 and the plurality of fluid control devices 10 to 16. Each of the first brackets 20 includes the first fixing portion 21 fixed to each of the resin members 4, the first leg portion 22 extending from the first fixing portion 21 away from the base plate 2, and the first installation portion 23 which protrudes from an end portion of the first leg portion 22 on a side opposite to the first fixing portion 21 to intersect with the first leg portion 22 and on which the joints 9 are installed.

According to such a configuration, the plurality of joints 9 and the plurality of fluid control devices 10 to 16 on which the heater 18 is mounted are disposed away from the base plate 2 by the first bracket 20 constituted by the first fixing portion 21, the first leg portion 22, and the first installation portion 23. Accordingly, a space is formed between the plurality of joints 9 and the plurality of fluid control devices 10 to 16 and the base plate 2, and thus it is possible to suppress the transfer of the heat generated by the heater 18 to the base plate 2. As a result, it is possible to suppress the influence of the heat on the fluid control devices adjacent to the gas line 3, for example, the fluid control devices of the other gas line 3 adjacent thereto.

Since each of the first leg portion 22 and the first installation portion 23 has a plate shape, it is possible to suppress the transfer of the heat generated by the heater 18 to the base plate 2.

The second brackets 30 provided between the base plate 2 and the resin members 4 are further provided, with each of the second brackets 30 being configured to include the second fixing portion 31 fixed to the base plate 2, the second leg portion 32 extending from the second fixing portion 31 away from the base plate 2, and the second installation portion 33 which protrudes from an end portion of the second leg portion 32 on a side opposite to the second fixing portion 31 to intersect with the second leg portion 32 and on which the resin member 4 is installed.

According to such a configuration, a space is formed between the resin member 4 and the base plate 2, and thus it is possible to further suppress the transfer of the heat generated by the heater 18 to the base plate 2.

The present disclosure is not limited to the above-described embodiment. A person skilled in the art can make various additions and changes within the scope of the present disclosure.

Figure 7:
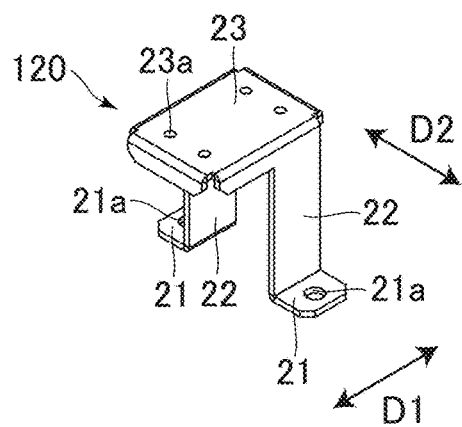
FIG. 7 is a perspective view of a first bracket according to a modification.
Figure 8:
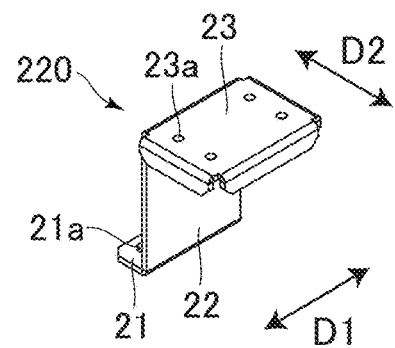
FIG. 8 is a perspective view of a second bracket according to a modification.

For example, a structure of the first bracket 20 is not limited to the structure shown in FIG. 5, and may be constituted, as in a first bracket 120 shown in FIG. 7, by two first fixing portions 21, two first leg portions 22, and the first installation portion 23. As in a first bracket 220 shown in FIG. 8, the first bracket 20 may be constituted by one first fixing portion 21, one first leg portion 22, and the first installation portion 23.

Although the second bracket 30 is fixed to the base plate 2 with the rivets 2B, the second bracket 30 may be fixed to the base plate 2 by welding. A portion of the heater 18 which heats the plurality of joints 9 and fluid control devices 10 to 16 may be a seat heater.

Although one resin member 4 is provided for two first fixing portions 21, one resin member 4 may be provided for each first fixing portion 21. Regarding the resin member 4, although the plurality of resin members 4 are provided, a single resin member 4 extending in the first direction D1 may be provided. Regarding the first bracket 20, although two first brackets 20 are provided in one gas line 3, one bracket 20 extending in the first direction D1 may be provided, or depending on the configuration of the fluid control device, the first bracket 120 shown in FIG. 7 and the first bracket 220 shown in FIG. 8 may be used. Regarding the second bracket 30, although the plurality of second brackets 30 are provided, a single second bracket 30 extending in the first direction D1 may be provided.

What is claimed is:

1. A fluid control apparatus comprising:
 a base plate; and
 a gas line that is installed on the base plate,
 wherein the gas line includes
 a resin member that is provided in a predetermined direction on the base plate,
 a first bracket that is provided on the resin member,
 a plurality of joints that is provided on the first bracket,
 a plurality of fluid control devices that is provided to the plurality of joints, and
 a heater that is mounted to the plurality of joints and the plurality of fluid control devices, and
 wherein the first bracket includes
 four first fixing portions that are fixed to the resin member,
 a first pair of first leg portions and a second pair of first leg portions that extend from the first fixing portions, respectively, in a direction away from the base plate,
 a first installation portion that is connected to an end portion of each of the first pair of first leg portions and the second pair of first leg portions on an opposite side to the first fixing portion to extend in the predetermined direction and on which the joints are installed, and
 the first pair of first leg portions and two first fixing portions to which the first pair of first leg portions are connected are located on one end side of the first installation portion in the predetermined direction and the second pair of first leg portions and remaining two first fixing portions to which the second pair of first leg portions are connected are located on another end side of the first installation portion in the predetermined direction.

2. The fluid control apparatus according to claim 1, wherein each of the first leg portions and the first installation portion has a plate shape.

3. The fluid control apparatus according to claim 1, wherein the resin member is a heat insulating member.

4. The fluid control apparatus according to claim 1, further comprising:
 a second bracket that is provided between the base plate and the resin member,
 wherein the second bracket includes
 a second fixing portion that is fixed to the base plate,
 a second leg portion that extends from the second fixing portion in a direction of away from the base plate, and
 a second installation portion that protrudes from an end portion of the second leg portion on an opposite side to the second fixing portion to intersect with the second leg portion and on which the resin member is installed.

5. The fluid control apparatus according to claim 2, further comprising:
 a second bracket that is provided between the base plate and the resin member,
 wherein the second bracket includes
 a second fixing portion that is fixed to the base plate,
 a second leg portion that extends from the second fixing portion in a direction of away from the base plate, and
 a second installation portion that protrudes from an end portion of the second leg portion on an opposite side to the second fixing portion to intersect with the second leg portion and on which the resin member is installed.

\* \* \* \* \*